United States Patent
Scholz et al.

(10) Patent No.: US 9,842,011 B2
(45) Date of Patent: Dec. 12, 2017

(54) DELEGATING A STATUS VISUALIZATION TASK TO A SOURCE APPLICATION BY A TARGET APPLICATION

(71) Applicants: Martin Scholz, Sankt Leon-Rot (DE); Heike Klews, Sankt Leon-Rot (DE)

(72) Inventors: Martin Scholz, Sankt Leon-Rot (DE); Heike Klews, Sankt Leon-Rot (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 14/568,320

(22) Filed: Dec. 12, 2014

(65) Prior Publication Data
US 2016/0170815 A1    Jun. 16, 2016

(51) Int. Cl.
G06F 9/44    (2006.01)
G06F 9/46    (2006.01)
G06F 9/54    (2006.01)

(52) U.S. Cl.
CPC .................... G06F 9/544 (2013.01)

(58) Field of Classification Search
CPC ..... G06F 9/544; G06F 3/04847; G06F 3/0482
USPC ....................................................... 719/312
See application file for complete search history.

(56) References Cited

U.S. PATENT DOCUMENTS

| | | | | |
|---|---|---|---|---|
| 2005/0097567 | A1* | 5/2005 | Monnie et al. | 719/315 |
| 2006/0294320 | A1* | 12/2006 | Yallapragada | 711/147 |
| 2009/0249433 | A1* | 10/2009 | Misra et al. | 726/1 |
| 2014/0359046 | A1* | 12/2014 | Colle | 709/213 |

OTHER PUBLICATIONS

Deploying JavaFX Applications; http://docs.oracle.com/javafx/2/deployment/preloaders.htm; Oct. 2013; excerpted Chapter 9; 22 pages.*

* cited by examiner

*Primary Examiner* — Craig Dorais
*Assistant Examiner* — Kimberly Jordan

(57) ABSTRACT

A target application loads target application's user interface (UI) after an initial preoperational task is completed. A task for visualizing a progress status for the target application is delegated to a source application that is used for launching the target application in a new window. The source application creates a shared object and assigns a unique identifier (ID) to the shared object. The unique ID of the shared object is passed to the target application, when the target application is launched from the source application. The shared object is accessed by the target application during the performance of the initial preoperational task. The target application stores progress status of the initial preoperational task in the shared object. The source application monitors the progress status stored in the shared object and presents it continuously on source application's user interface.

17 Claims, 6 Drawing Sheets

DELEGATING A STATUS VISUALIZATION TASK TO A SOURCE APPLICATION BY A TARGET APPLICATION

BACKGROUND

Software applications provide features to navigate to other applications through their user interface (UI). When a second application is launched through a first application, there could be some initial tasks to be performed by the second application. The second application may open part of its UI and wait for the execution of the initial tasks. However, it is possible that no UI is displayed until the initial tasks are completed. For example, it may not be technically possible to load the UI before the initial tasks. The initial tasks, may be for example different types of checks, calculations, service's performance, communication with a database, etc., and may take 10 second, 20 seconds, or even longer. Depending on the behavior of the second application, the user receives or does not receive feedback during initial tasks' execution. If no feedback is provided, then the user may initiate a second, third, etc., invocation of the second application from the first application's UI. Progress indicators are UI elements that may assist to provide feedback to the user regarding operation's progress. Progress indicators may reassure the user that the applications are working, but need time to provide targeted results. Progress indicators may have different forms on the UI—as a progress bar, a throbber, a text field, other.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for delegating a status visualization task to a source application by a target application are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

When an application is launched, a progress indicator may be used to show progress of loading the application. Providing feedback to a user about the progress of operations performed by an application may be useful if the performed operations are time consuming There are cases, when a first software application may give access through its UI to a second software application. The second software application may be opened in the same window as the first application, or in a new one. If there are time consuming initial tasks to be performed by the second application, the user may need progress information about when the second software application is going to be displayed. Not providing feedback about the progress of software operations may result in multiple invocations of the second software application, when the first attempt was successful but it took longer than the time expected by the user. The system may load a number of instances of the second application, when only one is needed.

In one embodiment, the second software application may become visible (displays its UI and shows a general screen) only after performing some initial operations. Therefore, when invoked from the first application in a new screen, the second application does not have UI to indicate its progress during performance of the initial operations. The first application has UI, but does not have knowledge about the operations performed by the second application. The progress is only known by the second application. The communication between the first and second software application may be asynchronous. The first application may allow users to invoke the second application several times and do not wait for the second application.

Figure 1:
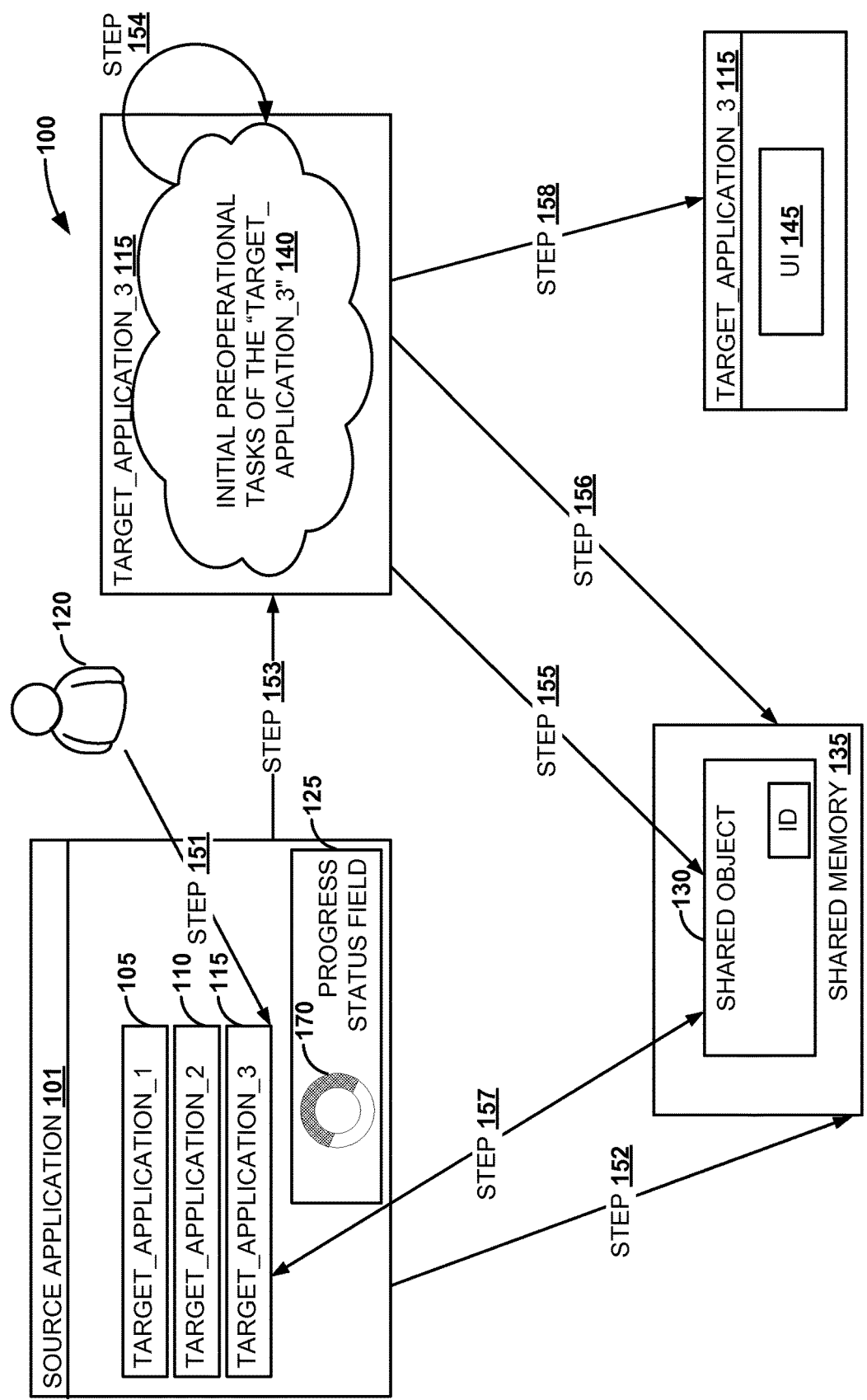
FIG. 1 is a block diagram illustrating an exemplary environment for delegating a visualization task for a progress status of a target application to a source application, according to one embodiment.

FIG. 1 is a block diagram illustrating an exemplary environment 100 for delegating a visualization task for a progress status of a target_application_3 115 to a source application 101, according to one embodiment. The source application 101 provides UI, which includes links for accessing target_application_1 105, target_application_2 110, target_application_3 115. At step 151, target_application_3 115 is invoked, for example through a user interaction by a mouse click, or a keyboard combination. The target_application_3 115 may be invoked by a user 120. The source application 101 creates at step 152 a shared object 130 with a unique identifier (ID) on a shared memory 135.

The unique ID of the shared object 130 is passed to the target_application_3 115 during step 153, when the target_application_3 115 is launched. In one embodiment, the source application 101 and the target_application_3 115 may run on one or on different application servers. If the source application 101 and the target_application_3 115 run on one application server, then the source application 101 may use shared memory on that application server for storing the created shared object 130. The source application 101 and the target_application_3 115 may run on different applications servers and the shared object 130 may be stored on a middleware layer that provides a shared memory, such as the shared memory 135.

The target_application_3 115 performs some initial preoperational tasks 140 during step 154. The initial preoperational tasks 140 may be preoperational tasks performed by the target_application_3 115 before a target_application_3's UI 145 or a screen is loaded. Such initial preoperational tasks 140 may be calculations, calling of external/internal service, taking information from a database to be displayed, checking for consistency, customization related tasks, etc.

In one embodiment, the target_application_3 115 may delegate the tasks of visualizing its progress of performing the initial preoperational tasks 140 to the source application 101. The progress status of performing the initial preoperational tasks 140 is information related to a waiting period before displaying the target_application_3 115. Therefore, the progress status of the target_application_3 115 is the progress status of performing the initial preoperational tasks 140. The source application 101 may display a progress indicator, such as a progress status field 125, with the progress status of target_application_3 115 during step 154. With the creation on the shared object 130 and passing its ID, the source application 101 informs the target_application_3 115 about an object, the shared object 130, to be used for communication of the progress of loading of the target_application_3 115. The communication between the source application 101 and the target_application_3 115 may be transformed from asynchronous to a synchronous communication through the use of the shared object 130. The source application 101 waits for the target_application_3's 115 loading and may stay blocked for interactions. Blocking the source application 101 may prevent invoking other pop-ups that may hide the displayed progress status field 125. Further, working with the source application 101 may interfere with regular updates of the progress status field 125 that keep the progress status up-to-date. Therefore, the synchronous communication may be a reliable communication approach.

In one embodiment, during step 154, the source application 101 may enter a listener mode, which includes becoming idle, and not allowing any user interactions with the source application 101. At step 155, during the execution of the initial preoperational tasks 140, the target_application_3 115 accesses the shared object 130 using the unique ID and stores there the progress status of the initial preoperational tasks 140. At step 156, the target_application_3 115 periodically updates the stored progress status on the shared object. The source application 101 at step 157 monitors and retrieves information about the progress status of target_application_3 115 from the shared object 130. The source application 101 displays the retrieved progress information in its UI in the progress status field 125. The progress status field 125 is updated at each periodical check of the shared object 130 that the source application 101 performs. The initial preoperational tasks 140 of the target_application_3 are completed at step 158. Then, the UI 145 of the target_application_3 115 may be displayed. When the target_application_3 115 is displayed, the progress status field 125 on source application 101 may display to the user 120 that the initial preoperational tasks 140 are completed and hide the progress status field 125. After hiding the progress status field 125, the source application 101 may enter back into a normal mode and react to other invocations made by the user 120, for example launching another target application. In one embodiment, during the normal mode of the source application 101, the source application 101 is accessible and provides its functionality in a productive manner.

Figure 2:
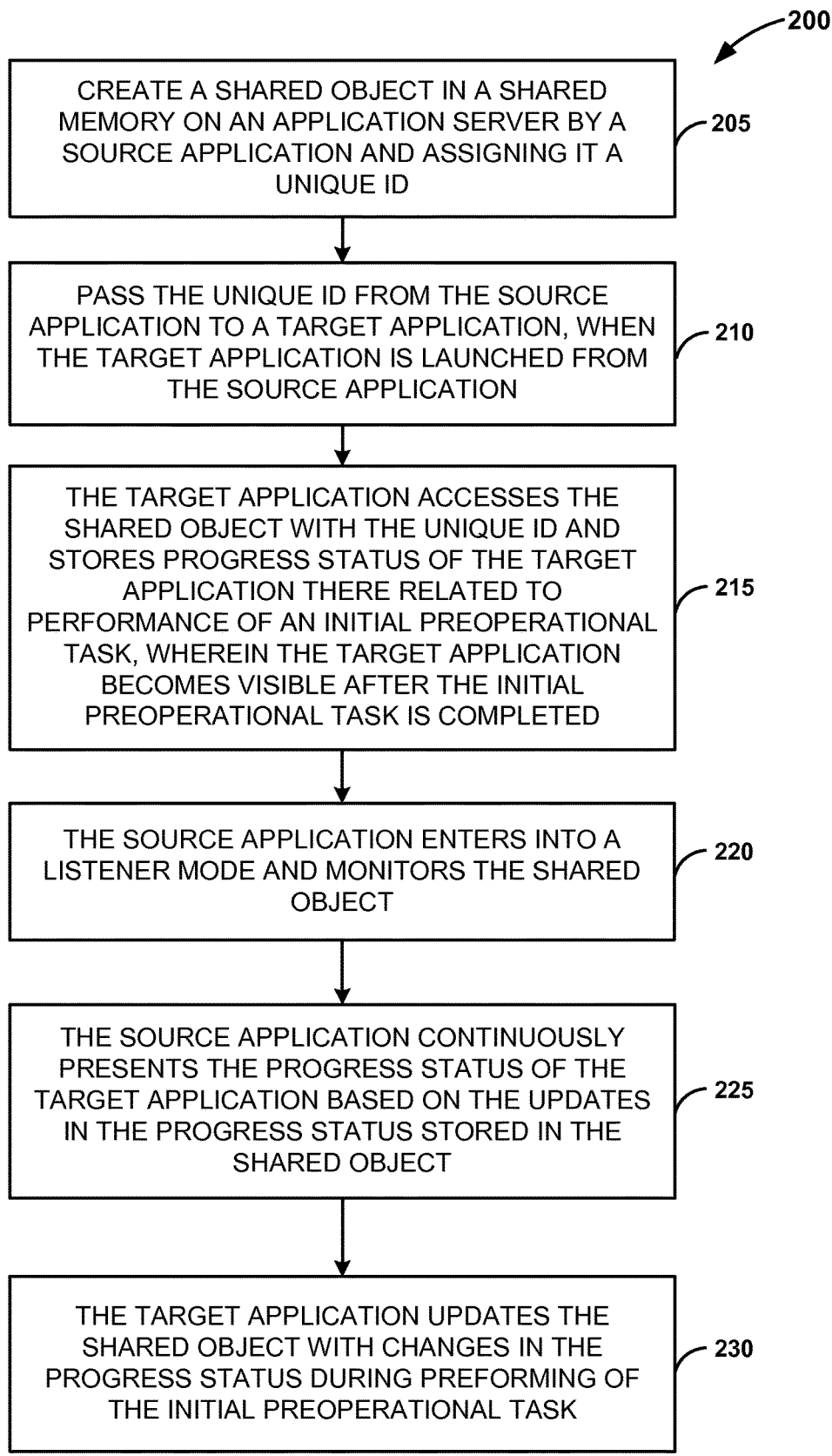
FIG. 2 is a flow diagram illustrating a process for delegating a status visualization task to a source application by a target application through a shared object, according to one embodiment.

FIG. 2 is a flow diagram illustrating a process 200 for delegating a status visualization task to a source application by a target application through a shared object, according to one embodiment. The source application and the target application may be such as the source application 101 and the target_application_3 115 from FIG. 1. The target application is invoked through the source application. At step 205, a shared object is created in a shared memory by the source application. The source application assigns it a unique ID. For example, the source application devotes this shared object to the target application. When the target application is launched through the source application at step 210, the unique ID is passed from the source application to the target application. At step 215, the target application accesses the shared object, created by the source application, using the unique ID. At step 215, the target application accesses the shared object with the unique ID and stores progress status of the target application while performing initial preoperational tasks. The initial preoperational tasks are performed by the target application before the user interface of the target application is loaded and the target application is not visible up until the initial preoperational tasks are completed. The progress status stored by the target application is information about the performance of the initial preoperational tasks. The progress information may be in form of a percentage value that shows the amount of work being completed related to the initial preoperational tasks. In one embodiment, the shared object may have a set (or push) method to be used for setting (pushing) a percentage value indicating current progress status of the target application before loading the UI of the target application.

At step 220, the source application, after launching the target application, enters into a listener mode and monitors the shared object and the stored progress status there. In one embodiment, the listener mode may include that the source application enters into an idle state and periodically checks the shared object for the current progress, e.g. current percentage value that may be stored by the target application. The source application uses the periodical checks during the listener mode to retrieve information from the shared object for the stored progress status. The retrieved information may be displayed by the source application and detected changes may be used for updating the displayed progress status. At step 225, the source application continuously and without disruption presents the progress status of the target application based on the information, which was periodically retrieved from the shared object. The source application presents the progress status while the source application is in the listener mode. If the progress status is stored in form of a percentage value, when the percentage value reaches 100%, the source application knows that the target application has finished with the initial preoperational tasks and that the target application may be visualized in a new window. In another embodiment, a flag or marks may be used instead of a percentage value. For example, the target application may store its progress status with indicators from a predefined list, including statuses such as "to be started", "in progress", "completed", etc. The use of flags with indicators is not limited to the suggested list. Additionally, progress status may be stored with graphical marks, having visual representation of the progress of performing the initial tasks. Such mark may be as element 170 on FIG. 1.

In one embodiment, the source application uses a "pull" mechanism associated with the shared object, where the source application is blocked and the source application retrieves information from the shared object and provides it on the screen. The periodical checks made by the source application may call a get method of the shared object that gets the percentage values stored. At step 230, the target application updates the shared object with changes in the progress status. The updates may be done during the performance of the initial preoperational tasks before the target application displays its UI. The updates made by the target application may be pulled from the shared object by the source application and the displayed progress status may be updated accordingly so that it provides without interruption an up-to-date information about the progress of loading of the target application.

Figure 3:
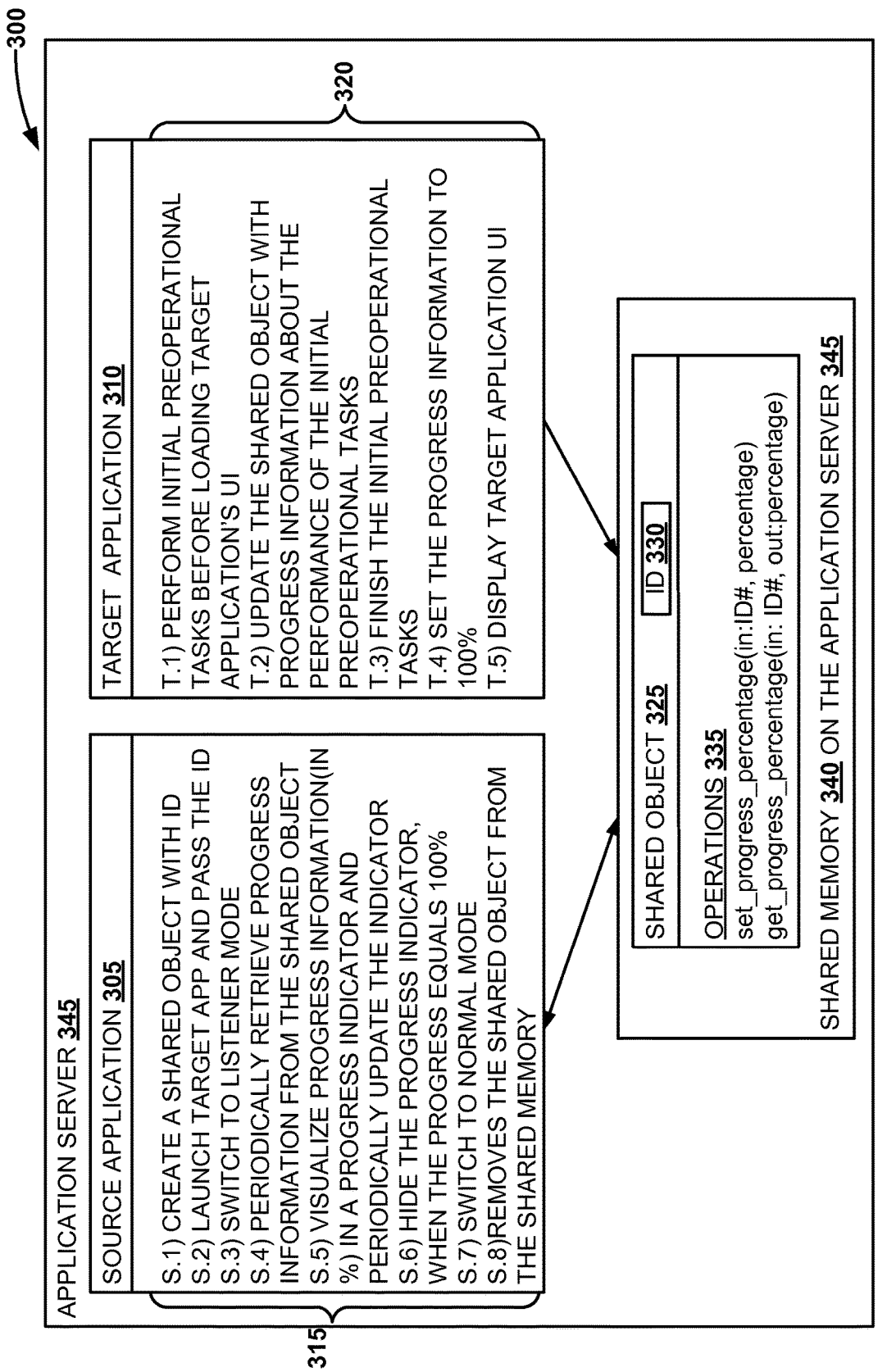
FIG. 3 is a block diagram illustrating an exemplary system for delegating a visualization task for a progress status of a target application to a source application through a shared object on shared memory of an application server, according to one embodiment.

FIG. 3 is a block diagram illustrating an exemplary system 300 for delegating a visualization task for a progress status of a target application 310 to a source application 305 through a shared object 325 on a shared memory 340 of an application server 345, according to one embodiment. The target application 310 is invoked from the source application 305. The target application 310, when launched, may appear in a new window and may display its UI only after a point in time, when one or more initial preoperational tasks are completed. In one embodiment, the initial preoperational tasks may be time consuming tasks and feedback is provided to the user in due course. The feedback may be information about the progress of the target application 310 during performing the initial preoperational tasks. The feedback may be provided within a progress indicator, and as the target application 310 does not have any UI to display it while performing the initial preoperational tasks, the target application 310 may delegate the visualization of the progress indicator with the progress status to the source application. The progress indicator may visualize progress status information related to the amount of work completed associated with the initial preoperational tasks. The progress status may be displayed in form of a percentage value, for example in a text field, as a progress bar, a throbber, or other. The delegation of visualization of the progress status imposes that some operations are performed by the source application and other by the target application 310 in a correlated manner. The source application 305 performs operations 315 and the target application 310 performs operations 320.

In one embodiment, the source application 305 communicates with the shared object 325. The source application 305 creates a shared object 325 with a unique ID 330, such as the shared object 130, FIG. 1. The target application 310 is launched and the source application 305 passes the unique ID 330 of the shared object 325 to the target application 310. The shared object 325 is used by the target application 310 to store information about the progress of performing the initial preoperational tasks of the target application 310. The source application 305 enters into a listener mode and periodically retrieves information from the shared object 325. The source application 305 visualizes on its UI the progress information (progress status) in a progress indicator field or other UI element for displaying the progress status. The visualization of the progress status is continuous and without interruption. The progress status may be displayed as a percentage value. The progress indicator may be hidden from the UI of the source application, when the initial preoperational tasks are completed and the target application 310 is displayed. When the initial preoperational tasks are completed, the progress status in percentage value form is 100%. The source application 305 switches to normal mode, and becomes accessible for users. The source application 305 may delete the created shared object 325, when the target application 310 is displayed in a new window.

In one embodiment, the target application 310 starts performing initial preoperational tasks after being invoked from the source application 305. The target application 310 first performs the initial preoperational tasks and only after their completion it becomes visible for the end user. The target application 310 stores information about the progress of the initial preoperational tasks in the shared object 325 during their execution. The shared object 325 is updated with progress status information on a regular basis, so that the shared object 325 stores the up-to-date progress status of the target application 310, which may be visualized by the source application. When the initial preoperational tasks are completed, then the progress status stored by the target application 310 in the shared object equals 100% (the progress status in percentage value). The progress status may be displayed in other forms, such as graphics showing visually current progress of completion of the initial preoperational tasks. The target application 310 displays its UI after the initial preoperational tasks are completed.

The shared object 325 has a unique ID 330 that is used for access by the target application 310. The shared object 325 may have two operations (methods) 335—set and get, that allows the target application 310 to set its progress status, and the source application 305 to get the information about the progress status that is about to be presented on the source application's UI. The unique ID 330 of the shared object 325 may be used as a handler for accessing the operations 335 and calling the set and get operations of the shared object 325. In one embodiment, the source application 305, the target application 310, and the shared object 325 may run on an application server 345.

Figure 4:
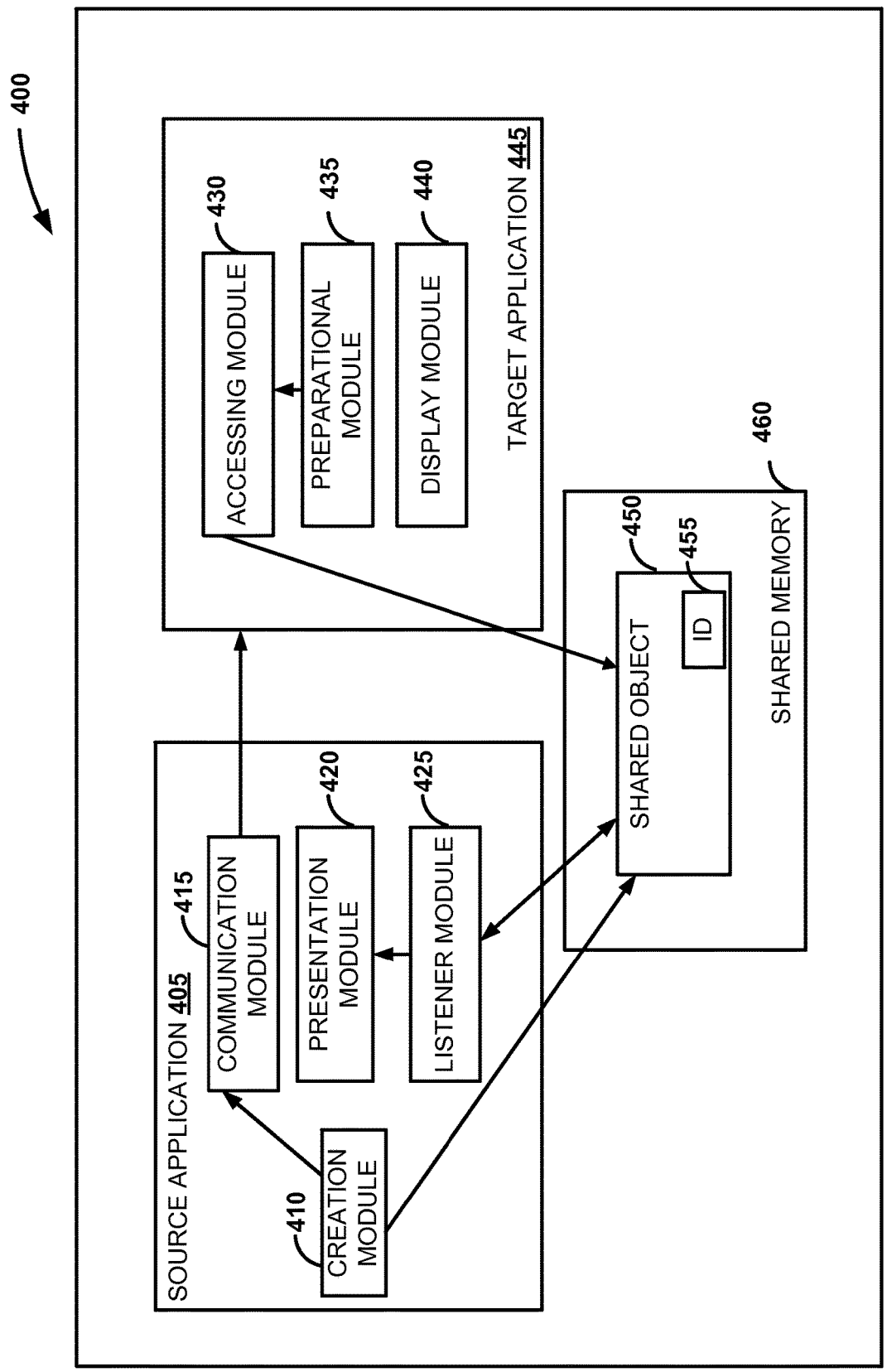
FIG. 4 is a block diagram illustrating a system for delegating a status visualization task to a source application during performance of an initial preoperational task for a target application before loading a UI of the target application, according to one embodiment.

FIG. 4 is a block diagram illustrating a system 400 for delegating a status visualization task to a source application 405 during performance of an initial preoperational task for a target application 445 before loading a UI of the target application 445, according to one embodiment. The source application 405 is part of the system 400 and is in communication with the target application 445. The target application 445 is invoked in a new window through the source application 405. The source application 405 is idle until the target application performs initial preoperational tasks and after that loads target application's UI in a new window. The initial preoperational tasks may be such as the initial preoperational tasks 140 from FIG. 1. The target application 445 provides a progress status about the progress of performing the initial preoperational tasks to the source application 405 through a shared object 450. With the use of the shared object 450, the target application 445 delegates the visualization of a progress indicator with a progress status of performing the initial preoperational tasks. During the execution of the initial preoperational tasks, the source application 405 stays idle in a listener mode and displays a progress indicator with the progress status, which gives feedback to a user about the waiting period he/she is supposed to have until the target application 445 is displayed and becomes active for further interactions.

In one embodiment, the source application 405 has a creation module 410 to create the shared object 450 on a shared memory 460. The shared memory 460 is accessible by both the source application 405 and the target application

445. The shared object 450 is assigned a unique ID 455 that is used for accessing by the target application 445. The source application 405 comprises a communication module 415 associated with the creation module 410. Through the communication module 415, the source application 405 passes the unique ID 455 to the target application 445, when the target application 445 is launched from the source application 405, for example by a user interaction. The target application 445 performs one or more initial preoperational tasks, e.g. consistency checks, before displaying the UI in a new window. The source application 405 has a listener module 425 through which the source application 405 listens to the shared object 450 and gets stored data about the progress status of the target application 445. Through the listener module 425 the source application 405 switches to a listener mode and becomes idle until the target application 445 completes the initial preoperational tasks and becomes visible by loading target application's UI for further interactions. During the listener mode, the source application 405 periodically checks and retrieves information from the shared object 450.

In one embodiment, when the target application 445 is displayed, then the listener module 425 switches the source application 405 into a normal mode and deletes the shared object 450 from the shared memory 460. The source application 405 includes a presentation module 420 to continuously present the progress status of the target application 445 during monitoring the shared object 450 and interactively updates the displayed progress status reflecting detected changes. The listener module 425 communicates with the presentation module 420 that presents retrieved information from the shared object 450. When the listener module 425 detects a change in the stored progress status in the shared object 450, it dispatches the information to the presentation module 420, so that the displayed progress status by the source application 405 reflects changes in a process of performing the initial preoperational tasks by target application 445.

In one embodiment, the target application 445 comprises an accessing module 430, a preparational module 435, and a display module 440. The preparational module 435 performs the initial preoperational tasks that the target application 445 executes before becoming visible to the user. The preparational module 435 communicates with the accessing module 430 and sends information about the progress status of the execution of the initial preoperational tasks. The accessing module 430 communicates with the shared object 450 using the unique ID 455 and accesses it to store the progress status of the target application 445 related to the performance of the initial preoperational tasks. When the preparational module 435 finishes all of the initial preoperational tasks, the display module 440 displays user interface of the target application 445. The accessing module 430 receives notification that the performance of the initial preoperational tasks is completed. The accessing module 430 sets the progress status of the target application 445 to "completed". In one embodiment, if the progress status is measured and stored in the shared object 450 in form of a percentage value, then after completing the initial preoperational tasks, the accessing module 430 may set the progress status to 100%. Then, the listener module 425 of the source application 405 may get that progress status from the shared object 450 and provide it to the presentation module 420. The progress status may be displayed in a progress indicator field. In one embodiment, setting and getting the progress status of performing the initial preoperational tasks may be accomplished through a set and get method provided by the shared object 450.

Figure 5:
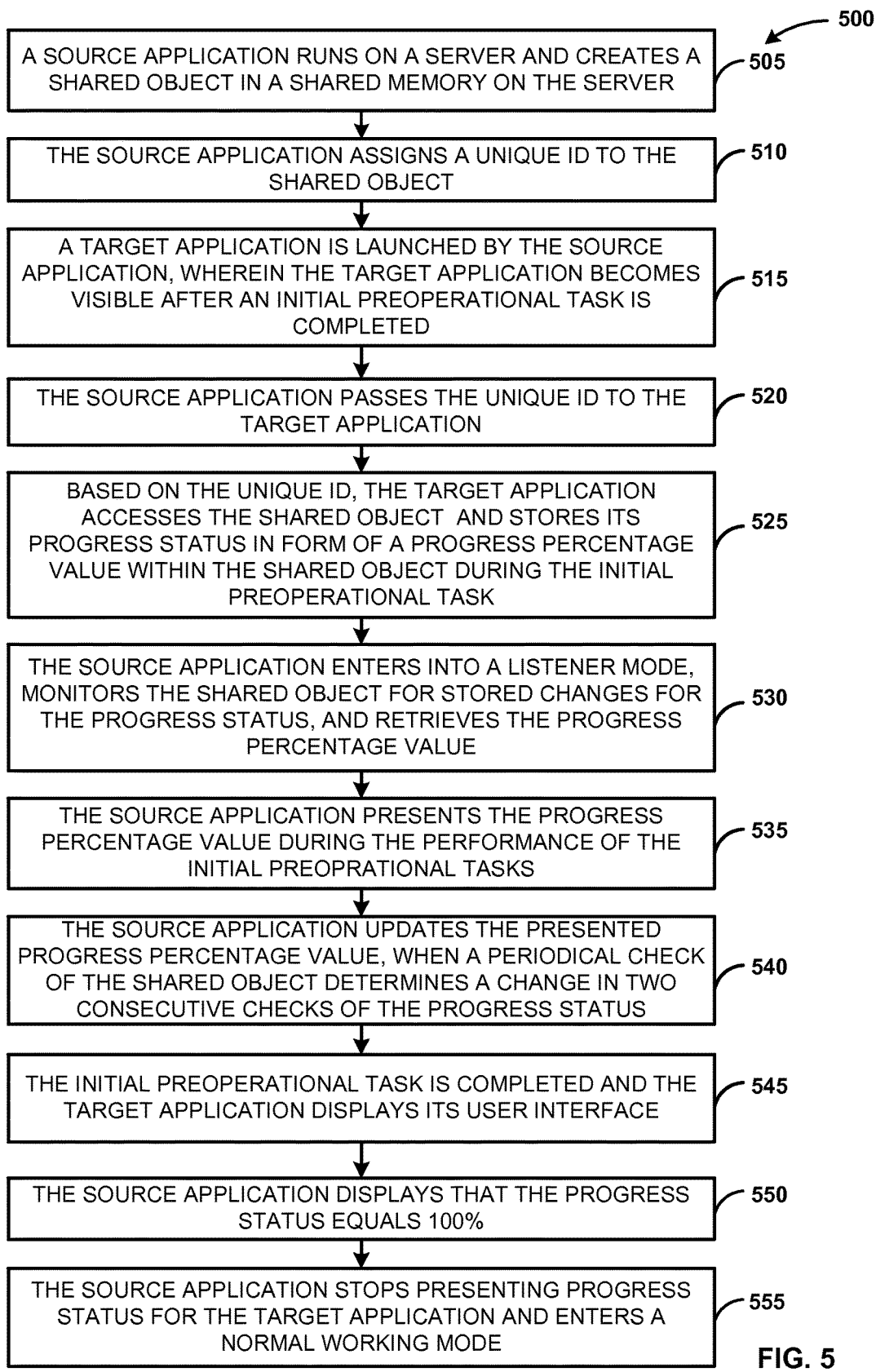
FIG. 5 is a flow diagram illustrating a process for delegating a status visualization task to a source application by a target application, according to one embodiment.

FIG. 5 is a flow diagram illustrating a process 500 for delegating a status visualization task to a source application by a target application, according to one embodiment. In one embodiment, the source application and the target application may be such as the source application 405 and the target application 445 in FIG. 4. At step 505, the source application runs on a server and creates a shared object on a shared memory on the server. At step 510, the source application assigns a unique ID to the shared object. At step 515, the target application is launched through the source application. In one embodiment, when the target application is invoked from the same user session used for logging into the source application, then the target application may run on the same server as the source application. The target application is invoked to be displayed in a new window and performs some initial preoperational tasks (one or more tasks) before visualizing its UI. During the process of performing the initial preoperational tasks, the source application may be idle and wait until the target application is loaded and allows users to work with the provided features by the target application. The target application performs the initial preoperational tasks and transfers the information regarding their progress to the source application. The source application has a loaded UI and functions to visualize the progress status of the target application, for example, to an end user. The communication between the source application and the target application may be accomplished through the shared object, created by the source application.

In one embodiment, to perform this delegation of visualization of the progress status of the target application, at step 520, the source application passes the unique ID of the shared object to the target application. At step, 525, based on the unique ID, the target application accesses the shared object and stores there its progress status, for example, in form of a progress percentage value (e.g. 32%, 76%, etc.). The target application stores the progress status in the shared object through the whole process of performing the initial preoperational task, until the target application is able to become visible and be displayed. At step 530, the source application enters into a listener mode and monitors the shared object for the stored progress status. During the listener mode of the source application, the target application stores concurrently the progress status in the shared object and the source application may retrieve the progress status periodically. The target application stores a new value for the progress status, when a change in the progress status of performing the initial preoperational steps appears. In one embodiment, the target application may report changes in the progress status in small steps, e.g. 1%, 2%, 3%, etc., or only in larger blocks such as 15%, 25%, 50%, etc.

At step 535, the source application presents the progress status. The progress status may be in form of a progress percentage value. At step 540, the source application updates the presented progress percentage value when a periodical check of the shared object determines a change in two consecutive checks of the progress status. The source application is able to continuously present an up-to-date progress status that corresponds to the current progress of execution of the initial preoperational tasks performed by the target application. At step 545, the initial preoperational tasks are completed and the target application's UI is displayed. At step 550, the source application displays the progress status, which equals 100%. At step 555, the source application stops presenting the progress status associated with the initial preoperational tasks and enters into a normal working mode. The source application may delete the shared object from the shared memory.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
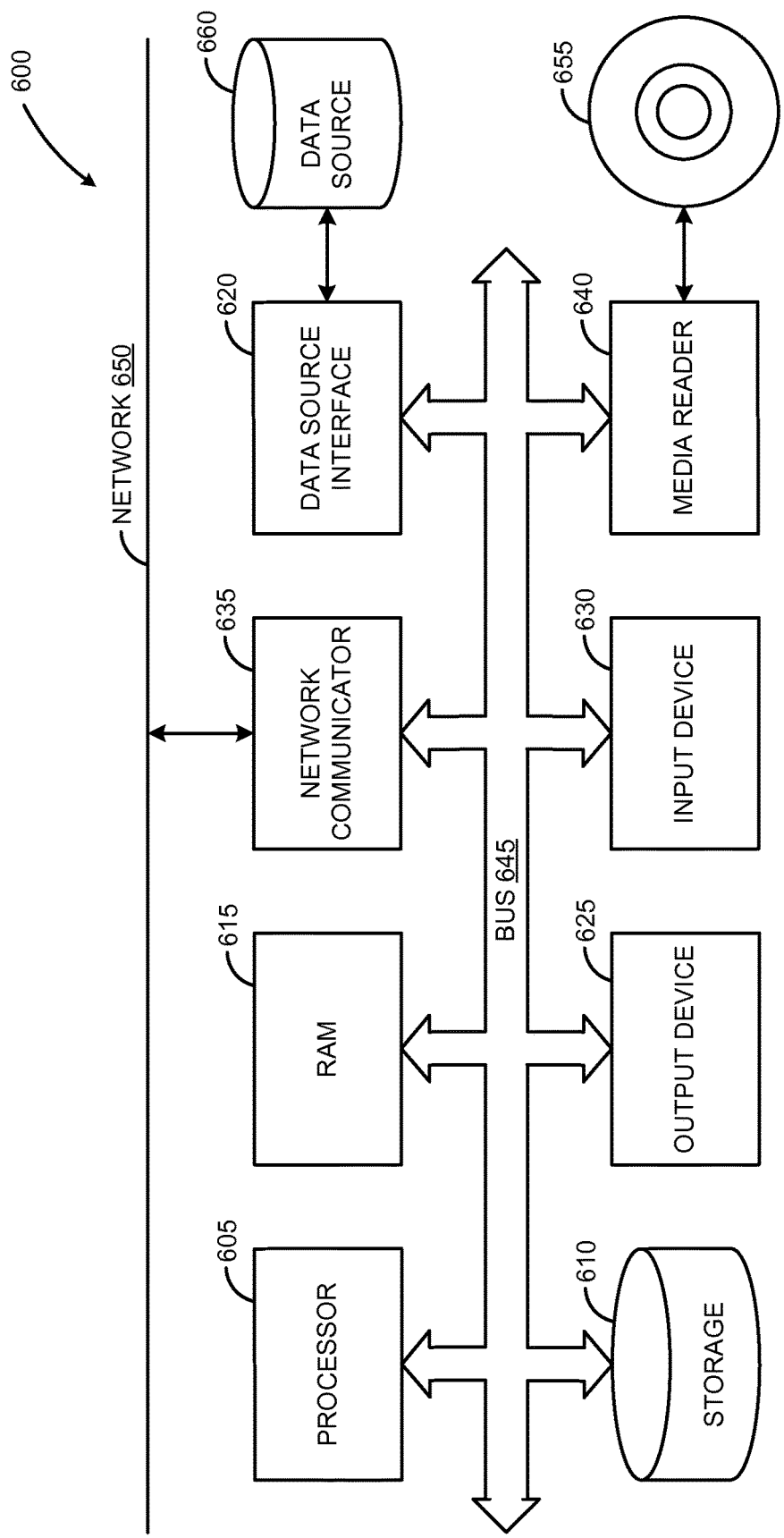
FIG. 6 is a block diagram illustrating an embodiment of a computing environment in which the techniques described for delegating a status visualization task to a source application by a target application can be implemented.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615.

The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for delegating a status visualization task to a source application by a target application, the method comprising:
    loading the source application into an initial window displaying a source application's user interface (UI);
    creating a shared object in a shared memory by the source application and assigning a unique identifier (ID) to the shared object;
    based on a received interaction with the source application's UI, invoking the target application from the source application's UI;
    based on the invocation, passing the unique ID from the source application to the target application;
    accessing the shared object by the target application based on the unique ID and storing a progress status of the target application within the shared object related to performance of an initial preoperational task associated with the target application, wherein the target application loads a target application's user interface (UI) in a separate window from the initial window displaying the source application's UI after the initial preoperational task is completed;
    the source application, entering into a listener mode to monitor the shared object, wherein the source application during the listener mode is blocked for receiving a user interaction at the source application's UI, and the source application is in the listener mode while the target application performs the initial preoperational task;
    the source application, continuously presenting the progress status of the target application during monitoring of the shared object and reflecting a detected change; and
    the source application, entering in a normal mode and removing the shared object, when the target application is displayed, wherein during the normal mode, the source application is in a productive state and the source application's UI becomes accessible for user invocations of related target applications, wherein access to the related target applications is provided through the source application's UI.

2. The method of claim 1, wherein the method further comprises:
    displaying the target application's UI, when the initial preoperational task is completed.

3. The method of claim 1, wherein the source application and the target application run on a server, and wherein the shared memory is on the server.

4. The method of claim 1, wherein entering into the listener mode comprises the source application to get into an idle state, periodically to check and retrieve information from the shared object for the stored progress status, and to update the presented progress status.

5. The method of claim 1, wherein the target application updates the shared object with relevant status information during performance of the initial preoperational task.

6. The method of claim 1, wherein continuously presenting the progress status further comprises:
    the target application, defining the progress status in form of a progress percentage value; and
    the source application, continuously presenting the progress percentage value during monitoring the shared object until the percentage value reaches 100.

7. The method of claim 1, wherein the progress status presented by the source application is updated, when a periodical check of the shared object determines a change between two consecutive checks of the progress status stored by the target application.

8. A computer system for delegating a status visualization task to a source application by a target application, comprising:
    a processor;
    a memory in association with the processor storing instructions, which when executed by the processor generates modules comprising:
        a UI display module to load a source application's user interface (UI) into an initial window;
        a creation module to create a shared object in a shared memory by the source application and assigning a unique identifier (ID) to the shared object;
        based on a received interaction with the source application's UI, a communication module to invoke the target application from the source application's UI and to pass the unique ID from the source application to the target application, wherein the source application and the target application run on one or more servers;
        an accessing module to access the shared object by the target application based on the unique ID and store a progress status of the target application within the shared object related to performance of an initial preoperational task associated with the target application, wherein the target application loads a target application's user interface (UI) in a separate window from the initial window displaying a source application's UI after the initial preoperational task is completed;
        a listener module associated with the source application to listen and monitor the shared object, wherein the source application during a listener mode is blocked for receiving a user interaction at the source application's UI, and the source application is in the listener mode while the target application performs the initial preoperational task;
        a presentation module associated with the source application to continuously present the progress status of the target application during monitoring the shared object and reflecting a detected change;
        a display module associated with the target application to display the target application's UI in the separate window, when the initial preoperational task is completed; and
        the source application, enter in a normal mode and removing the shared object, when the target application is displayed, wherein during the normal mode, the source application is in a productive state and the source application's UI becomes accessible for user invocations of related target applications, wherein access to the related target applications is provided through the source application's UI.

9. The system of claim 8, wherein the listener module is further operable to put the source application into a listener mode, which comprises the source application to get into an idle state, periodically to check and retrieve information from the shared object for the stored progress status, and to update the presented progress status.

10. The system of claim 8, wherein the target application updates the shared object with relevant status information during performance of the initial preoperational task.

11. The system of claim 8, wherein the listener module retrieves progress information in form of a progress percentage value from the shared object.

12. The system of claim 11, wherein the presentation module is further operable to:
continuously present the progress percentage value during monitoring the shared object, wherein the presented percentage value is updated when the progress status of the target application changes.

13. The system of claim 8, wherein the progress status presented by the presentation module is updated, when a periodical check of the shared object determines a change between two consecutive checks of the progress status stored by the target application.

14. An article of manufacture to delegate a status visualization task to a source application by a target application, comprising a non-transitory computer readable storage medium including executable instructions, which when executed by a computer, cause the computer to:
load the source application into an initial window displaying a source application's user interface (UI);
create a shared object in a shared memory by the source application and assigning a unique identifier (ID) to the shared object;
based on a received interaction with the source application's UI, invoke the target application from the source application's UI;
based on the invocation, pass the unique ID from the source application to the target application;
access the shared object by the target application based on the unique ID and store a progress status of the target application within the shared object related to performance of an initial preoperational task associated with the target application, wherein the target application loads a target application's user interface (UI) in a separate window from an initial window displaying a source application's UI, after the initial preoperational task is completed;
the source application, enter into a listener mode to monitor the shared object and to retrieve information for a change in the stored progress status, wherein the source application becomes idle while in the listener mode, wherein the source application is blocked for receiving a user interaction at the source application's UI, and the source application is in the listener mode while the target application performs the initial preoperational task;
the source application's UI, continuously present the progress status of the target application during monitoring the shared object and reflecting the detected change;
display the target application's UI in the separate window, when the initial preoperational task is completed; and
put the source application in a normal mode and removing the shared object, when the target application is displayed, wherein during the normal mode, the source application is in a productive state and the source application's UI becomes accessible for user invocations of related target applications, wherein access to the related target applications is provided through the source application's UI.

15. The article of manufacture of claim 14, wherein the target application updates the shared object with relevant status information during performance of the initial preoperational task.

16. The article of manufacture of claim 14, wherein the instructions to continuously present the progress status of the target application further comprise instructions, which when executed by a computer, cause the computer to:
the target application, define the progress status in form of a progress percentage value; and
the source application, continuously present the progress percentage value during monitoring the shared object until the percentage value reaches 100.

17. The article of manufacture of claim 14, wherein the progress status presented by the source application is updated, when a periodical check of the shared object determines a change between two consecutive checks of the progress status stored by the target application.

* * * * *